Aug. 10, 1965 M. L. JAFFA ETAL 3,199,448

SCREEN PRINTER IN WHICH THE SQUEEGEE IS MOVED IN DIRECTION OPPOSITE TO STENCIL MOVEMENT

Original Filed Dec. 18, 1961 4 Sheets-Sheet 1

INVENTORS
Matthew L. Jaffa
David Jaffa

BY Irving Seidman
ATTORNEY

INVENTORS
Matthew L. Jaffa
David Jaffa
BY Irving Seidman
ATTORNEY

INVENTORS
Matthew L. Jaffa
David Jaffa
BY
Irving Seidman
ATTORNEY

INVENTORS
Matthew L. Jaffa
David Jaffa
BY
Irving Seidman
ATTORNEY

United States Patent Office 3,199,448
Patented Aug. 10, 1965

3,199,448

SCREEN PRINTER IN WHICH THE SQUEEGEE IS MOVED IN DIRECTION OPPOSITE TO STENCIL MOVEMENT

Matthew L. Jaffa, 92 Clark Court, Rutherford, N.J., and David Jaffa, 38—26 Allwood Place, Fair Lawn, N.J.

Original application Dec. 18, 1961, Ser. No. 159,956. Divided and this application Oct. 30, 1964, Ser. No. 407,822
6 Claims. (Cl. 101—123)

This application is a divisional application of our copending application, Serial No. 159,956, filed December 18, 1961.

This invention relates in general to an apparatus for screen printing, and more specifically to an improved apparatus for screen printing repeating design on a continuous strip of material.

Heretofore, in screen printing a design on continuous strips of material it was customary to carry out the indexing of the material and subsequent printing of material in sequential steps or operations. Even in high speed machines each operation required a lapse of a predetermined amount of time before the next operation could be performed. Consequently, the time required to print a given design by known machine or methods was equal to the sum of the time it took to perform each of the necessary succeeding operation or series of steps, as for example, indexing the material by driving a belt on which the material is supported, positioning the screen and associated squeeegee on the material, printing the material by moving either the squeegee or the screen during the printing stroke, raising the screen and squeegee off the material, returning the screen to start position, and repeating the indexing of the material again in readiness for the next repeat.

Also, in the known continuous strip screen printing machines, the material was indexed for each repeat by laying the material on a belt that was directly driven by driving rollers. In such machines it has been noted that the direct driving of a belt tended to induce a stretch to the belt. The induced stretch of the belt in turn caused the material to stretch. Consequently, the added stretch of the belt and material resulting from such directly driven indexing belts tended to distort and decrease the accuracy of the indexing and printing of the design.

Therefore an object of this invention is to provide an improved apparatus for screen printing repeating designs on continuous strips of material at a considerable faster rate than by apparatus now known.

Another object is to provide a machine for automatically performing the improved method of this invention.

Still another object is to provide for improved means and manner of increasing the accuracy of the indexing and printing operation or step.

Still another object of this invention is to provide for the respective and opposite movement of the screen and squeegee relative to each other during the screen printing opration an amount sufficient to assure that the squeegee overrides the stenciled area of the screen to provide the necessary overlap for accurate printing and positive indxing.

The objects and other features and advantages are attained by an improved screen printing method in which both the indexing and printing operations are conducted simultaneously; i.e., the printing stroke is occurring at the same time that the material is being indexed for the next repeat. In accordance with this invention, the method is preferably automatically carried out on a machine that includes an endless belt on which the material to be printed is supported, means for positively holding the belt and material thereon in its exact stopping position, a printing head including the screen reciprocally mounted for movement with the belt for indexing the same, means for moving the screen and associated squeegee vertically between printing and non-printing positions, means for gripping the printing head to the belt and materials, means for reciprocating the printing head to index the belt and material gripped thereto when the screen and squeegee are in printing position; and means to provide for the respective and relative opposite movement of the screen and its associated squeegee during the indexing stroke to effect simultaneous printing of the material and whereby the relative movement of the screen and squeegee effect sufficient overriding of the squeegee to assure accurate indexing and printing of the material.

Therefore a feature of this invention resides in the provision wherein the indexing and printing of the material are simultaneously performed and thereby eliminate a heretofore time consuming step or operation.

Another feature resides in the relative and opposite respective movements of the screen and its squeegee during the printing and indexing operation to assure for accurate alignment of each repeat, the relative movement of the squeegee and screen further reducing the time required to traverse the printing and indexing stroke.

Still another feature resides in the particular manner in which the belt is indirectly driven so as to assure elimination of stretch in both the belt and material supported thereon during printing and indexing of the material.

Another feature of this invention resides in the provision of a perforated belt utilized in conjunction with means for producing a vacuum as a means for firmly securing the belt and material in exact stopping position before and after printing and indexing operations; e.g., during the return of the printing head upon the completion of the printing and indexing stroke.

Other features and advantages will become more readily apparent when considered in view of the following description and drawing in which.

Figure 2:
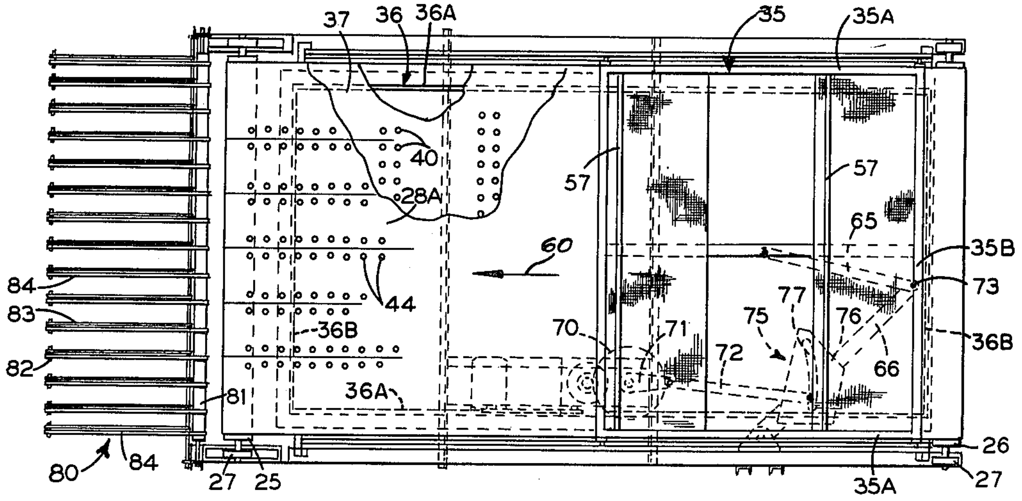
FIG. 2 is a plan view of the machine of FIG. 1 but shown without the squeegee assembly.

The instant invention is directed to an improved apparatus of screen printing repeating designs on a continuous strip of material and primarily on a fabric material. The apparatus to be described, however, may be equally applicable for the screen printing of paper, cardboard, metal, glass or plastic, either in a continuous web or in individual units. It will be understood that the expression "repeating design" is herein meant to include the printing of a single continuous distinct design in succeeding sections; as well as to the repeating of a given design several times on a continuous strip of material.

The improved apparatus of this invention comprises means for continuously and successively taking a section of a sheet material from a source of continuous supply and placing the same on a movable or indexing belt. Preferably the belt is perforated and is movably mounted to slide over a perforated table that is connected up to a suction or a pressure reducing device so that by evacuating the air from beneath the belt and material the same may be held fast in its exact stopping position.

A printing head including a carriage containing a screen or a series of screens and associated squeegees is placed over the material to be printed. In accordance with this invention the material to be printed is held fast to the belt by evacuating the air to create a suction or vacuum under the belt as the printing head is positioned thereon. With the belt head fast and the printing head in position the screen and associated squeegee are lowered onto the material into printing position. With the screen in printing position the belt and material are secured to the printing head. With the carriage, belt and material secured, the vacuum holding the belt and material fast is released. The carriage, including the screen, belt and material, is then driven as one in the direction of belt travel causing the screen to pass the squeegee a distance equal to the repeat of the design. The relative movement of the screen past the squeegee causes the color to flow out of the leading well portion of screen onto the material. In this manner the material is indexed at the same time that it is being printed, the belt and material being indirectly driven to minimize stretch.

To insure accurate indexing and printing of the material an important aspect of the improved apparatus is to provide for a slight movement of the squeegee relative to the screen in a direction oposite to the movement of the screen or the direction of the belt travel an amount sufficient to permit the squeegee to override the printing or stenciled area of the screen. In this manner the squeegee, upon the termination of the printing and indexing stroke, will be disposed in the opposite or trailing well portion of the screen. The degree of overlap afforded by this relative movement between squeegee and screen enhances the registration of the design to be printed with the previously printed design.

According to the apparatus of this invention, the forward end of the printing screen is gradually raised above the surface of the material as the printing carriage and the belt advance during the printing and indexing step so that at the end of the indexing step the screen is completely separated from the printed material. At this point the suction on the belt is again applied to hold the indexing belt in its exact stopping position; and the gripping means securing the carriage to the belt is released. The squeegee is then raised off the screen and the screen raised to level position above the belt. With the screen and associated squeegee off the belt and material, the carriage including the screen is returned to initial start position in preparation to repeat the operation.

Figure 1:
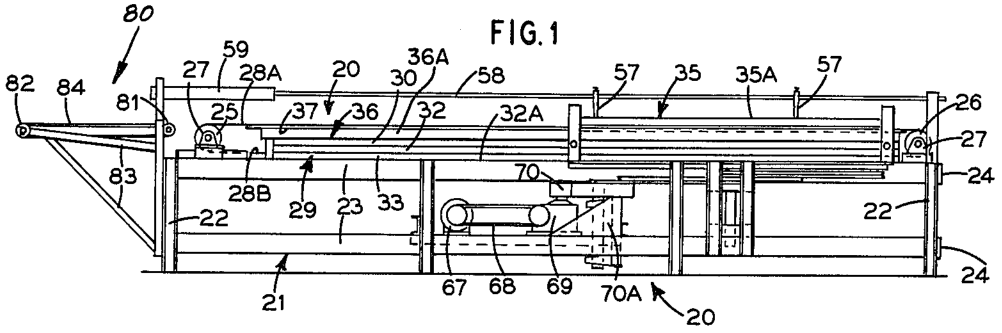
FIG. 1 is a side elevation view of the screen printing machine by which the improved method of this invention is automatically carried out.

As shown in FIGS. 1 and 2, the machine 20 comprises a frame or bed 21. The frame 21 is defined by corner upright leg members 22 interconnected by longitudinally and transversely extending structure tie member 23, 24 respectively. Mounted adjacent each end of the frame 21 are rollers 25 and 26 rotatably journaled in suitable bearings 27. Stretched over the rollers 25 and 26 is an endless belt having an upper flight 28A and lower flight 28B.

Figure 11:
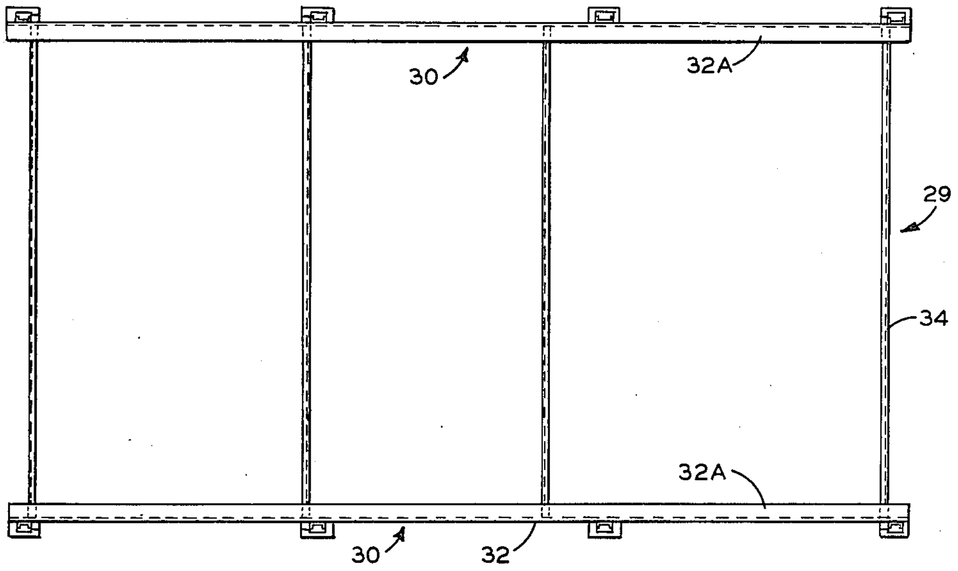
FIG. 11 is a detail plan view of the vacuum belt subassembly.
Figure 12:
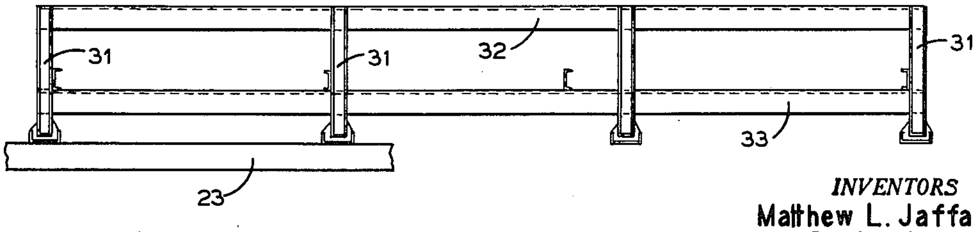
FIG. 12 is a side elevation view of FIG. 11.

Connected to the frame or bed 21 and extending between rollers 25 and 26 is a belt sub-assembly 29. As shown in FIGS. 1, 11 and 12, the belt sub-assembly 29 comprises spaced parallel side 30, each including spaced vertical supports 31 for supporting the sub-assembly 29 on upper longitudinal member 23 of the frame 21. Between the upright supports 31 extend a pair of spaced structural members 32, 33.

A plurality of spaced transversely extending cross-ties members 34 extend between the opposed sides 30 of the frame sub-assembly 29. As shown in FIG. 11, the upper longitudinal members 32 of the sub-assembly 29 consist of an angle member having its flange 32A turned inwardly. Flange 32A, disposed in a substantially horizontal plane, defines a rail on which the printing head 35 is free to slide or roll, as will be hereinafter described.

Supported on the frame sub-assembly 29 and between sides 30 of the sub-assembly 29 is a table frame 36. The table frame 36 comprises simply rectangularly disposed structural members 36A, 36B supported between the sides 30 of the frame sub-assembly 29. Supported on the table frame 36 is a table top 37. As shown, in FIGS. 1 and 2 the table top 37 is disposed immediately below the upper flight 28A of the belt 28 to form a support therefor.

Figure 6:
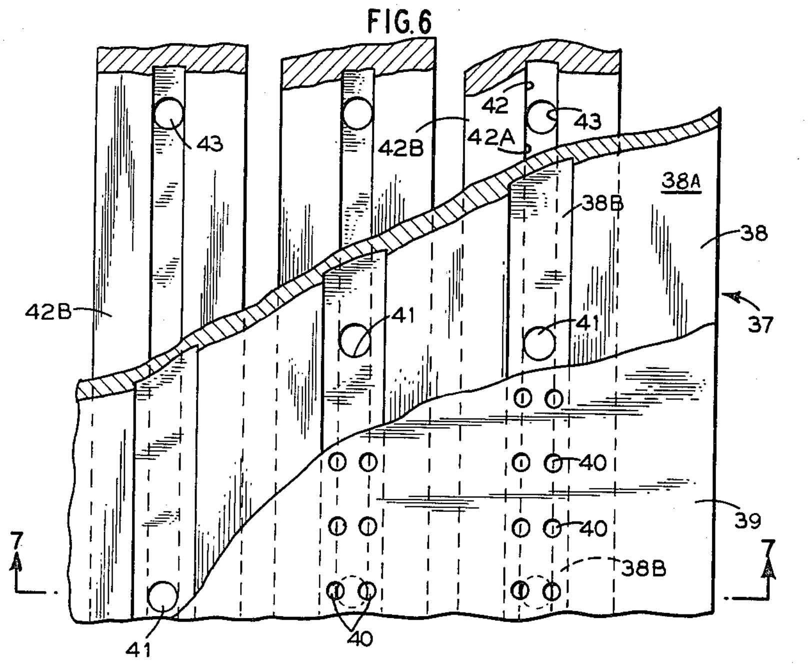
FIG. 6 is an enlarged detail plan view of the vacuum belt support table.
Figure 7:
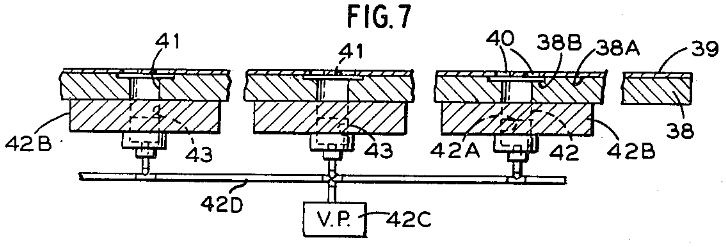
FIG. 7 is a section view taken along line 7—7 of FIG. 6.

In the illustrated embodiment the table top 37 and the belt 28 are each provided with a series of perforations or holes 40, 44 respectively. Referring to FIGS. 6 and 7, the table top 37 consists of a table member 38 having a surface 38A formed with a series of spaced transversely extending grooves 38B. Extended over the surface of the table member 38 is a covering sheet 39 to define a smooth flat surface. This covering sheet 39 may consist of a sheet of thermosetting plastic, e.g. "Formica" or the like. Formed in the covering sheet 39 and in alignment with each of the transversely extending grooves 38B are a series of holes 40. Each of holes 40 is thus in communication with their respective grooves 38B. Grooves 38B in turn are connected by a bore 41 in communication with a chamber 42 defined by a groove 42A formed in a block 42B connected to and extended transversely of the member 38 and in alignment with groove 38B. The chamber 42 defined by the groove 42A in block 42B, in turn, is connected to a suitable vacuum producing means or pressure reducing means 42C by a suitable conduit 42D connected to a hole 43 which forms an outlet for exhausting air from the chambers 38B and 42A. Thus it will be apparent that the openings or perforations 40 formed in the table covering 39 are connected to the pressure reducing means 42C, which, when energized, will draw or evacuate the air from channels 38B and 42 and thereby create a suction on the belt supported on top 39. This suction holds the belt fast.

The belt 28, arranged to be supported on the perforated table top 39, is likewise formed with a series of openings 44 therein which are arranged to register with some of the holes 40 in the table top. Thus when a strip of material is positioned over the belt 28, the material is held fast to the belt 28 and the belt held fast to the table top 37 upon the reduction of pressure or the creation of the vacuum therebeneath.

In accordance with this invention the printing head 35 is reciprocally mounted on the frame sub-assembly 29. As shown in FIG. 1, the printing head includes a carriage having opposed side assemblies 35A interconnected by suitable crossties 35B to define a rectangular structure. Each side assembly 35A includes corner posts 45 interconnected by longitudinal stringers 46 and 47. Stringer 46 comprises an angle member having a leg portion 46A turned inwardly of the carriage so as to be disposed in a horizontal plane. Spaced below the stringer 46 is a second stringer 47 and it too is an angle member. Stringer 47 has its leg or flange 47A turned inwardly and parallel to the flange 46A of stringer 46.

A plurality of spaced piston and cylinder assemblies 48, preferably pneumatically operated, are mounted on flange 47A of the lower stringer 47. Fixed to the piston rod 48A of the respective piston and cylinder assembly 48 is a longitudinally extending plate 49 which is common to the piston rods 48A of each piston and cylinder assembly 48.

Figure 10:
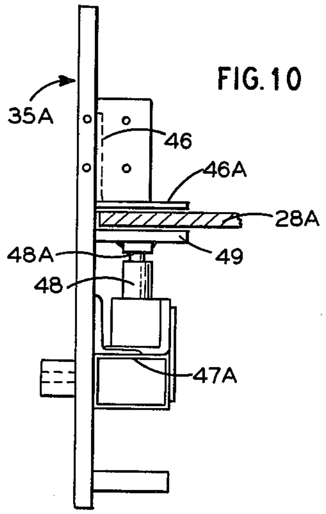
FIG. 10 is an end view of FIG. 8.
Figure 4:
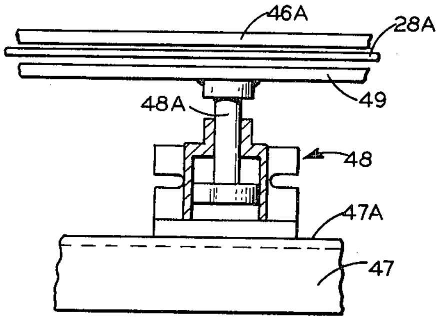
FIG. 4 is an enlarged detail view of the one form of a belt gripping means.
Figure 8:
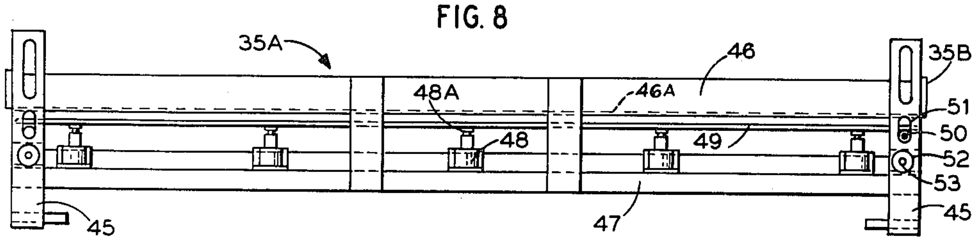
FIG. 8 is a detail side elevation view of the vacuum belt carriage clamp assembly of this invention.
Figure 9:
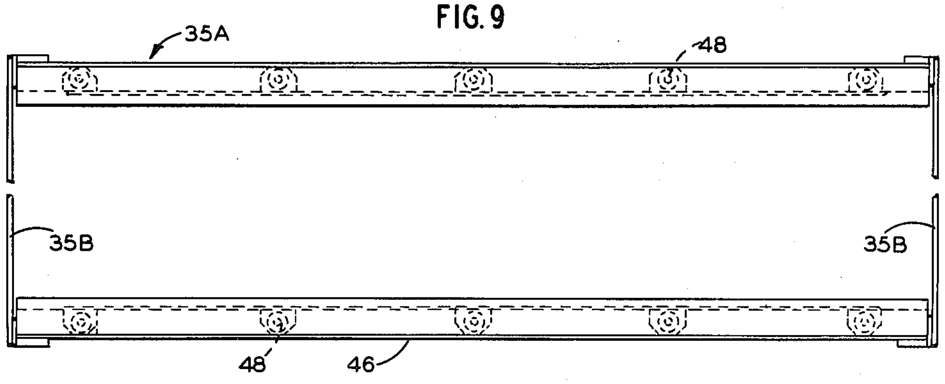
FIG. 9 is a plan view of FIG. 8.

As shown in FIGS. 4, 8, and 10, the flange 46A of stringer 46 and the plate 49 connected to the piston assemblies 48 are disposed, respectively, above and below the marginal portion of the upper flight 28A of the belt 28. Thus flange 46A and plate 49 function as a mechanical grip for securing the carriage 35 to the belt 28 as will be hereinafter described.

In accordance with this invention the flange 46A of the opposed side members 35A constituted the fixed jaw of a mechanical gripper means. The plate 49 connected to the piston rods 48 form the movement jaw of the gripper means. When the piston and cylinder assemblies become energized, by either pneumatic or hydraulic pressure, the movable jaw 49 is moved outwardly toward fixed flange 46A to clamp therebetween the belt 28. A guide 50 connected to the ends of the movable jaw or plate 49 rides in an elongated slot 51 formed in the corner post 45 and serves to guide plate 49. Rollers 52 rotatably journaled on suitable pins 53 connected to extend outwardly from each corner post 45 guide the carriage 34 for reciprocable movement along the rails 30 defined by the frame sub-assembly 29.

With this construction of the gripper means described it is recognized that the inturned flange 46A occupies a marginal portion of the belt 28, and therefore decreases the useful area of the belt 28 by an amount equal to the sum of the areas of the respective fixed jaws 46A. Therefore, if it is preferred to utilize this portion of the belt, it will be understood that a vacuum type means (not shown) may be substituted in lieu of the mechanical grippers described. Gripping the carriage 35 to the belt 28 by such vacuum gripper will function in the manner similar to that hereinbefore described with reference to the vacuum belt holding table top 37. With a vacuum gripping means, the entire surface area of the belt 28 is free to be utilized. Thus a larger printing area is afforded by vacuum grippers without a resulting increase in the overall width of a given belt.

Supported within the carriage are one or more printing screens 55. If more than one screen 55 is supported in the carriage, they are spaced one from the other so that the distance between the stenciled portions thereof is equal to the index of the repeat. Each printing screen 55 therefore consists of a central stenciled portion which forms the area of design to be printed, and impervious or well portions disposed on either side of the stencil portion for containing the color to be forced through the screen. Thus, the impervious or well portions overextend the printed area of the preceding printed design. For example, for a repeat of 72 inches the length of the screen may be 84 inches. This then provides for a 6 inch well on either side of the repeat. Such silk screen constructions are well known, as exemplified by U.S. Patents 2,545,277 and 2,566,919. Therefore a more detailed description of such screen is not considered essential to an understanding of this invention.

According to this invention each screen 55 is supported within the carriage 35 for vertical movement between operative printing position and inoperative non-printing position. Piston and cylinder assemblies 56 operatively connected to each screen serve to raise and lower the respective screens in and out of printing position.

Figure 3:
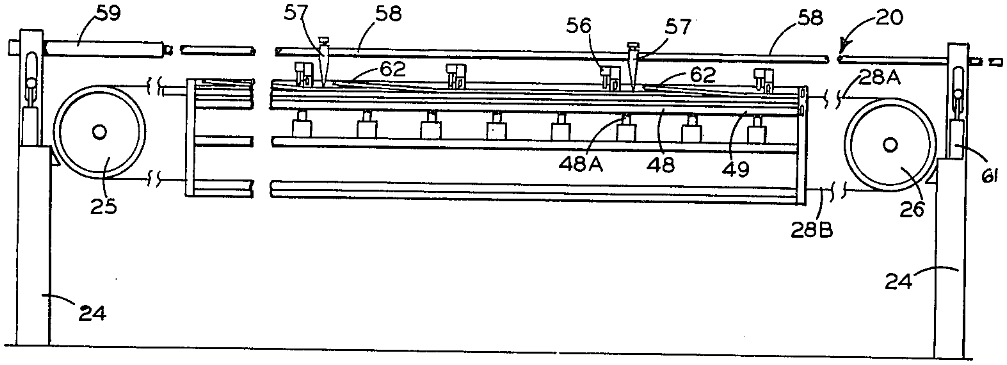
FIG. 3 is an enlarged schematic side elevation view of the machine.
Figure 5:
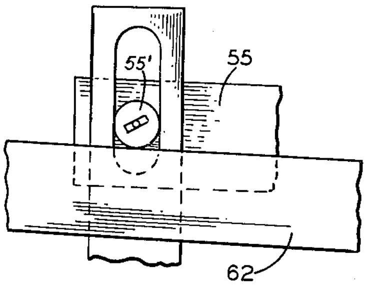
FIG. 5 is an enlarged detail of the screen raising cam.

Operatively associated with each screen 55 is a squeegee 57. As shown in FIG. 3 the squeegee 57 extends transversely of its respective screen 55 and each is connected to the piston rod 58 of a fluid actuated piston and cylinder 59 assembly. In the illustrtaed embodiment the piston rod 58 on which the squeegees 57 are mounted is arranged to move the squeegees 57 relative to their respective screens 55 in a direction opposite to the travel of the belt during the printing stroke. For example, when the carriage 35, belt 28, and material move to the left as indicated by arrow 60, the squeegees 57 are moved slightly in the opposite direction. According to this invention, the squeegees are also mounted for vertical movement between printing and non-printing position. Piston and cylinder assemblies 61 function to raise and lower the squeegees and their actuating piston and cylinder assembly 59 between printing and non-printing positions.

Inclined cam means 62 are connected to the sub-assembly 39 adjacent the side of the carriage 35. The cams 62 are arranged with respect to the respective screens 55 supported within the carriage 35 to effect gradual raising of the forward end of the respective screens 55 as the printing carriage 35 and screens 55 carried thereby are advanced through the printing cycle of the machine. This is attained by cam followers 55′ connected to screen 55 riding up inclined cams 62 as the carriage and screen carried thereby is advanced during a printing and indexing stroke. The arrangement of the cams 62 and associated screens 55 is such that the screens 55 are vertically displayed so as to be completely separated from the printed material at the end of the printing stroke.

In accordance with this invention, the belt 28 and material supported thereon are indexed by a drive means acting directly on the carriage 35. For indexing the belt, the gripper jaws 46A, 49 are actuated to secure the carriage 35 to the belt 28 with material supported thereon. As shown in FIG. 2, the carriage is connected to the frame by a linkage assembly consisting of a first link 65 pivoted at one end to the carriage 35 and a second link 66 pivoted at one end to the frame 21 with the adjacent ends of the link 65, 66 pivotally connected at 73 (FIG. 2). Means for driving the carriage 35 include a motor 67 connected to a gear train 69 by a belt drive 68. The gear train 69 in turn meshes with main gear 70 rotatably mounted on a vertical shaft 70A. Connected to gear 70 is a crank arm 71. The crank arm 71 in turn is pivotally connected at one end to a connecting link 72. The other end of link 72 connects to an intermediate point of link 66.

Thus it will be observed that actuation of the motor 67 actuates a carriage drive linkage 65, 66, 72, 71 in a manner to transmit a linear movement to the carriage and belt connected thereto.

If desired means 75 may be provided for infinite indexing of the printing stroke between two given points. This is readily attained in the embodiment of FIGS. 1 and 2 by a plate 76 connected to carriage link 66. Plate 76 is formed with an arcuate slot 77 in which the end of link 72 may be adjustably connected. Thus, it will be noted that by adjusting the end of link 72 relative to the slot 77 or plate 76, the throw of the carriage links 65, 66 may be varied accordingly and thus effect the means for adjusting or controlling the travel of the carriage 35 and belt 28 secured thereto for any given design consideration. While a mechanical gear type drive is described, it will be appreciated that the same may be attained by a pneumatic or hydraulic drive.

To complete the description of the machine assembly, the machine described has a take off assembly 80 fixed to one end of the frame 21. As shown, the take off assembly 80 consists of a main drive roller 81 and a plurality of idler rollers 82 spaced from the main roller 81. Suitable support brackets 83 space the idlers 82 from the main roller 81. Each of the idlers 82 in turn are connected in driving relationship to the main roller 81 by a series of belt drives 84.

Having thus described the essential structural features of the machine, the operation of the machine is as follows:

The desired index or repeat of the design to be printed is first adjusted by properly fixing the end link 72 in the proper relationship with respect to slot 77 of plate 76. With this adjustment set the material is then positioned on the belt and the belt and material held fast by actuating the vacuum or low pressure means to evacuate the air from beneath the belt and material.

The printing head 35 is then positioned over the material in the start position. Screens 55 carried thereby and the associated squeegees 57 are then respectively lowered into printing position onto the material by the actuation of the cylinder and piston assembly 56 and 61, respectively. With the screen 55 and squeegee 57 placed in printing position on the material, the squeegees 57 are initially disposed in the leading or forward well portion of their respective screens 55. Upon the lowering of the screens 55 and squeegees 57 to printing position on the material the gripping jaws 46A, 49 on the sides 35A of the carriage 35 are actuated to firmly grip the belt 28 and material thereon to the carriage 35. With the belt 28 firmly gripped by the carriage gripping means, the vacuum holding the belt fast is released.

At this point the motor 67 of the carriage drive means is actuated to move as a unit the carriage 35, the screens 55 and the belt 28 and material gripped thereto in the direction of belt travel. In doing so the screens 55 move relative to the respective squeegees 57. It will thus be noted that the drive mechanism is acting directly on the carriage; with the belt 28 and material gripped by the carriage 35 being indirectly driven thereby. In this manner any tendency of the belt 28 and/or material to stretch during the printing stroke is virtually eliminated.

By moving the screens 55 relative to the squeegees 57 the color in the leading well portion of the screen is forced to flow through the stenciled portion of the screen onto the material to print the design of the given stencil.

As the carriage, screen, belt and material gripped thereby are moving through the printing stroke, the forward ends of the respective screens are gradually raised off the material due to the action of the screens 55 relative to cams 62; so that at the end of the printing stroke the screen 55 is completely raised off the material.

In accordance with the invention, to assure that the printing area is the same length as the repeat or the index travel of the belt 28, the respective squeegees 57 are moved upon actuation of piston and cylinder assembly 59 in a direction opposite to the direction of belt travel. The squeegees 57 are moved relative to the screens 55 an amount sufficient to insure that the squeegees 57 terminate in the opposite or trailing well portion of the screen at the end of the printing stroke. Thus the carriage 35, screen 55, belt 28, the material, and squeegee 57 are all in motion simultaneouly. The simultaneous motion is scuh that the carriage 35, screen 55, belt 28 and material are all traveling in one direction as a unit at a given rate and the squeegees 57 moving at a lesser rate in a direction opposed to the travel of the belt 28. This relative movement assures necessary overlap of the squeegees relative to the printed designs.

At the completion of printing stroke, the vacuum means is actuated to create the vacuum or suction to hold the belt and material in its exact stopping position. At this point the gripper means of the carriage securing the belt 28 is released. Squeegees 56 are then raised by means of cylinder assembly 59 above the belt. The carriage 35 with the screen 55 therein is then returned to an initial start position, and the apparatus is positioned to repeat the operation.

While the instant invention has been disclosed with references to a particular embodiment for practicing the same, it is to be appreciated that the invention is not to be taken as limited to all of the details thereof as modifications and variations thereof may be made without departing from the spirit or scope of the invention.

What is claimed is:

1. An apparatus for continuously screen printing repeating designs on a strip of material comprising a frame, means for indexing the repeat of the material to be printed, a printing head including a carriage movably mounted on said frame, a screen carried by said carriage, said screen having a central stenciled portion and a leading and trailing well portion, a squeegee associated with said screen mounted on said frame, means for moving said screen and squeegees between operative printing position and inoperative non-printing position, whereby said squeegee is initially and finally disposed in said well portions of the screen, means for securing said indexing means and material supported thereon to said carriage in the printing position of said screen and associated squeegee, drive means for moving said carriage, the screen carried thereby and indexing means secured thereto relative to said squeegee an amount substantially equal to the repeat of the design whereby said squeegee forces the color through said screen onto said material, and means for moving said squeegee in a direction opposite to that of the screen during printing an amount sufficient to finally position the squeegee in the trailing well portion of the screen.

2. The invention as defined in claim 1 and including means to lift the leading edge of the screen off the material during the printing and movement of said carriage and indexing means so that at the end of said movement the screen is completely off the material.

3. The invention as defined in claim 2 wherein said drive means includes means for adjusting the amount of repeat.

4. An apparatus for screen printing repeating designs on a continuous strip of fabric comprising:

(a) a frame,
(b) an endless belt adapted to be movably mounted on said frame for supporting the strip of fabric to be printed,
(c) said belt having an upper flight and a lower flight,
(d) a table top disposed immediately below the upper flight,
(e) said table top and belt each having a series of holes disposed therein,
(f) a printing head including a carriage reciprocally mounted in said frame above the belt,
(g) a screen carried in said carriage,
(h) a squeegee operatively associated with said screen,
(i) means for moving said screen and associated squeegee vertically for movement between printing and non-printing position,
(j) means for creating a suction through the holes in said belt and table, for holding the belt and fabric to be printed fast as said screen and squeegee is moved to and from printing positions,
(k) means on said carriage for gripping the upper flight of said belt when said screen and associated squeegee is disposed in printing position on the fabric,
(l) drive means for reciprocally moving said carriage with belt and fabric secured thereto when said squeegee and screen are disposed in printing position whereby said carriage moves the screen relative to the squeegee to force the color through the screen onto said fabric to affect a simultaneous printing and indexing stroke,
(m) and means for moving the squeegee during the printing stroke in a direction opposite the movement of said screen an amount sufficient to override the index of the repeat.

5. The invention as defined in claim 4 and including means to gradually raise the leading edge of the screen as the screen advances during the printing stroke so that at the end of said stroke, the printing carriage is completely separated from the fabric.

6. An apparatus for screen printing repeating designs on a continuous strip of fabric comprising:

(a) a frame,
(b) an endless belt adapted to be movably mounted on said frame for supporting the strip of fabric to be printed,
(c) said belt having an upper flight and a lower flight,
(d) a table top disposed immediately below the upper flight,
(e) said table top and belt each having a series of holes disposed therein,
(f) means for creating a suction through the holes in said belt and table for securing the fabric to be printed on said belt, (g) a printing head including a carriage reciprocally mounted in said frame above the belt, (h) a series of screens carried in said carriage, said screens being spaced one from the other an amount equal to the repeat of the design, (i) a squeegee operatively associated with each of said screens, (j) means for moving said screens and associated squeegee vertically for movement between printing and non-printing position, (k) means on said carriage for gripping the upper flight of said belt when said screens and associated squeegees are disposed in printing position, (l) said gripping means including a fixed jaw and a movable jaw for gripping a marginal portion of the belt disposed therebetween, said jaws being rendered operative as screens and associated squeegees are moved to printing position, (m) drive means for reciprocally moving said carriage, belt and fabric gripped thereto by said jaws when said squeegees and screens are disposed in printing position whereby said carriage moves the spaced screens relative their respective squeegees to force the color through the respective screens onto said fabric, (n) means associated with said drive means for varying the index of the repeat, (o) and means for moving the respective squeegee during the printing stroke in a direction opposite the movement of said screens an amount sufficient to override the index of the repeat.

References Cited by the Examiner

UNITED STATES PATENTS

| | | | |
|---|---|---|---|
| 1,610,818 | 12/26 | Spadone et al. | 226—95 |
| 1,807,979 | 6/31 | Groetschel | 101—115 |
| 2,018,989 | 10/35 | Wulf | 101—126 |
| 2,566,919 | 9/51 | Black et al. | 101—415.1 |

FOREIGN PATENTS

| | | |
|---|---|---|
| 776,429 | 6/57 | Great Britain. |
| 851,167 | 10/60 | Great Britain. |

WILLIAM B. PENN, *Primary Examiner.*

EUGENE R. CAPOZIO, *Examiner.*